Sept. 8, 1936.  E. J. KINGSBURY  2,053,400
MACHINE TOOL
Filed Aug. 10, 1934  4 Sheets-Sheet 1
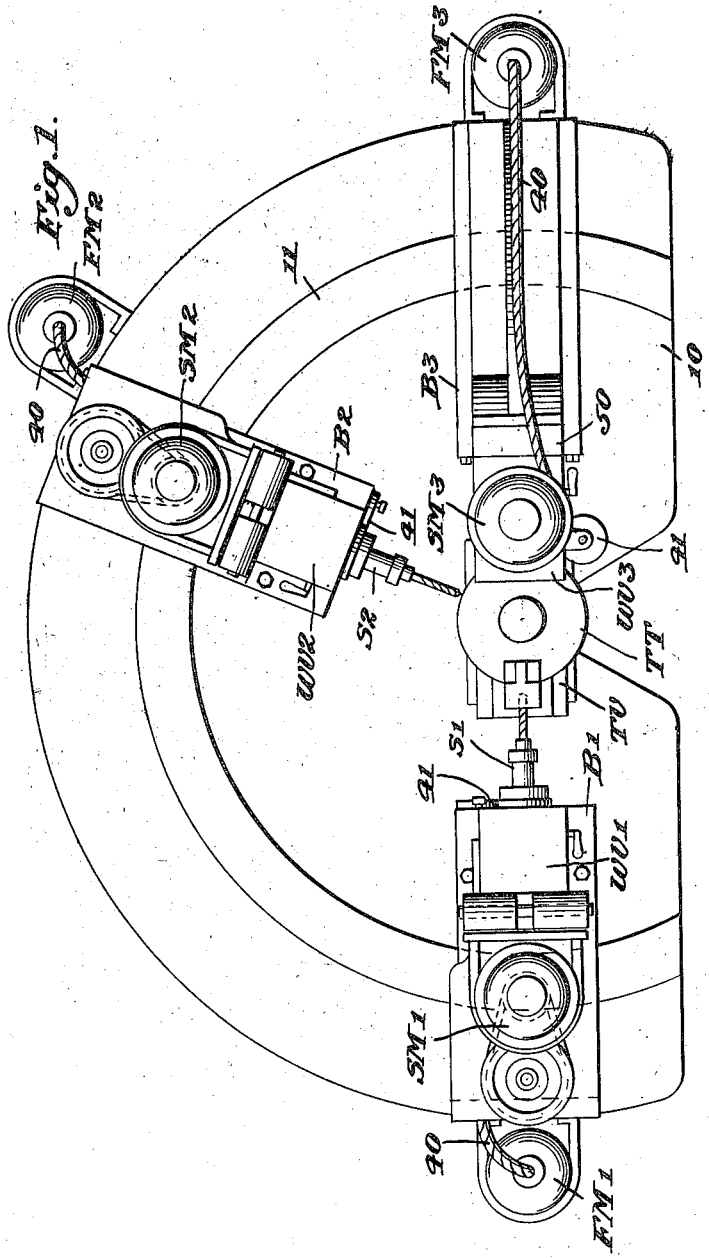
Inventor:
Edward J. Kingsbury,
by Sturtevant + Mason
Att'ys.

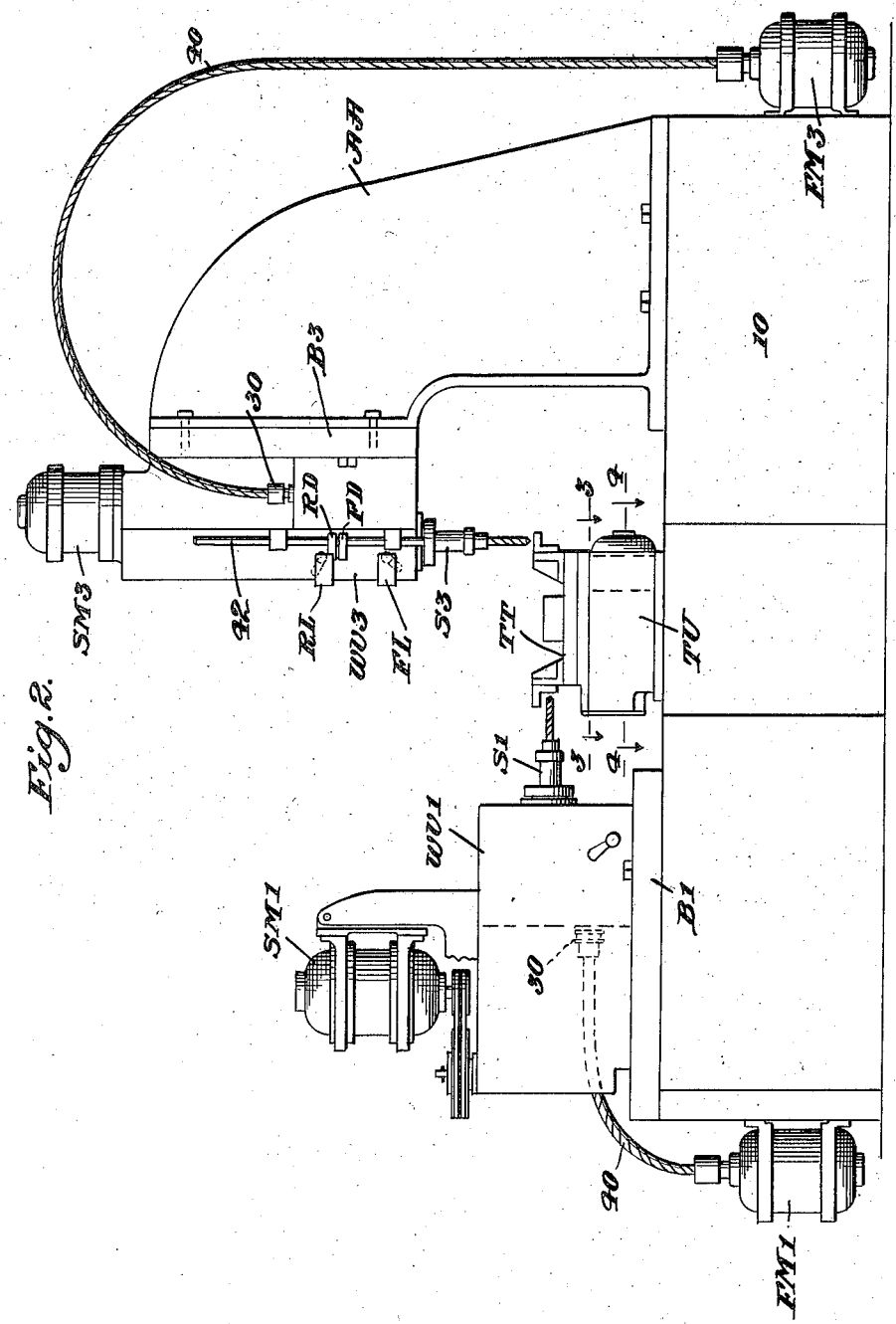

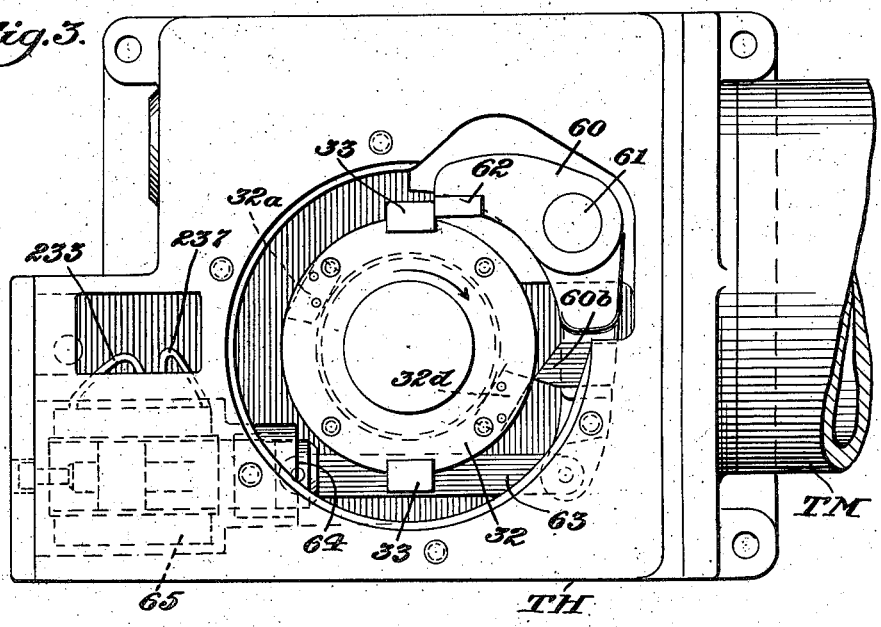
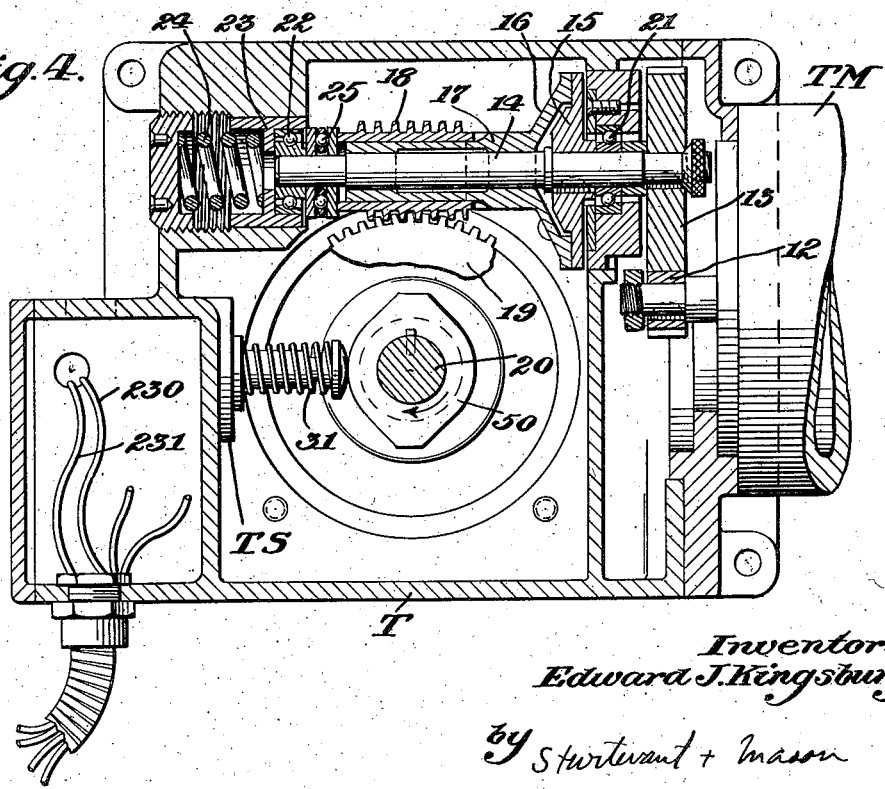

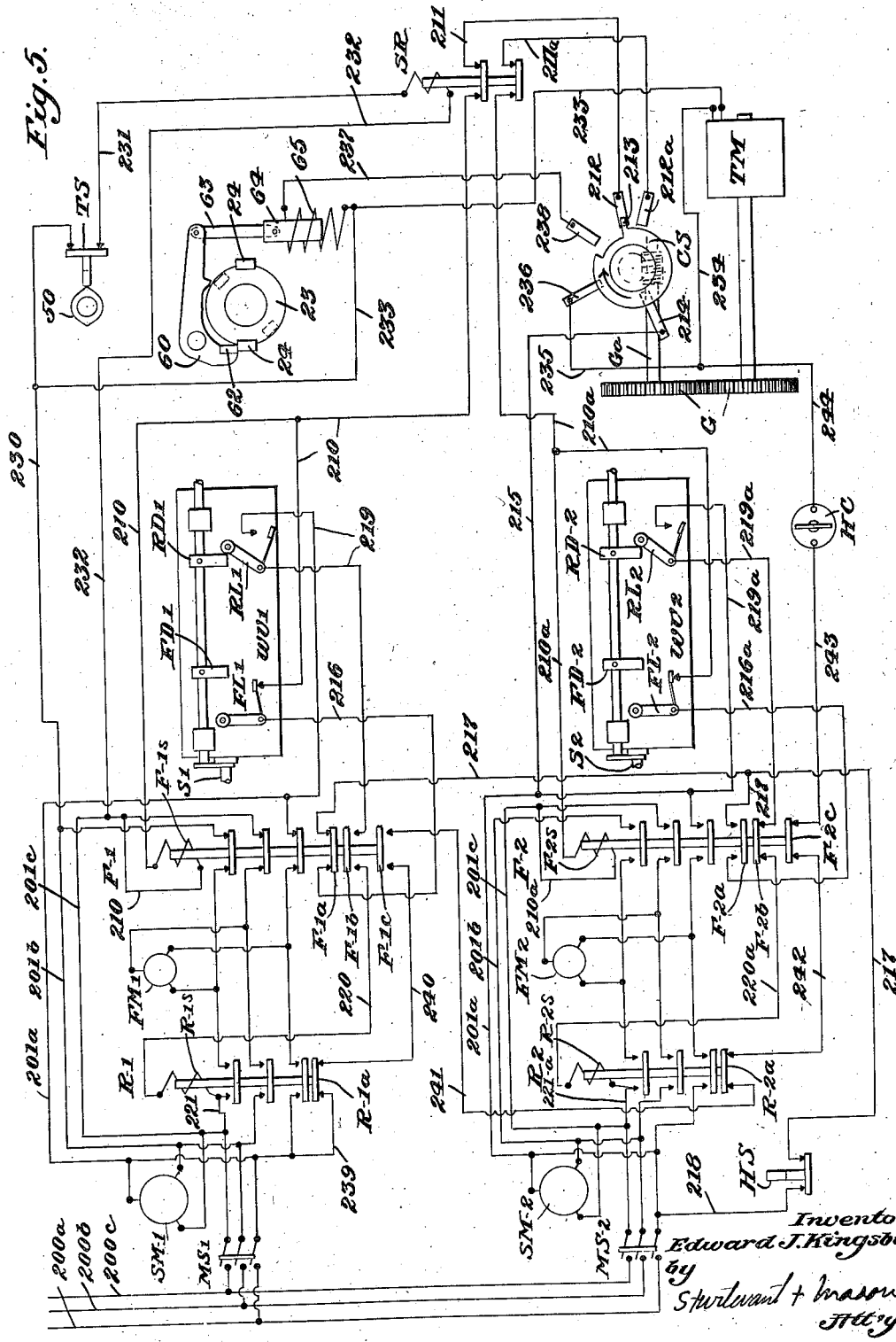

Patented Sept. 8, 1936

2,053,400

UNITED STATES PATENT OFFICE 2,053,400

MACHINE TOOL

Edward Joslin Kingsbury, Keene, N. H.

Application August 10, 1934, Serial No. 739,305

14 Claims. (Cl. 29—38)

This invention relates to improvements in machine tools of the type in which a plurality of individual work units are controlled for coordinated operation.

One of the features of the present invention is the provision of a machine tool having a plurality of work units with independent driving means for the tools thereof, and with independent driving means for advancing and withdrawing the tool, such feeding means being located upon a general frame so that it is not moved during an adjustment of the tool and its holder and of the tool driving means, in combination with a flexible connection between the source of power for the feeding means and the tool unit and operative at various positions of adjustment of the tool unit without movement of the source of power for the feeding means.

Another feature of the present invention is the provision of a machine tool having a plurality of work units each of which has associated therewith a source of power for feeding a tool, with a common control system for determining the initiation of operation of such source, such common control system operating to cause the units to come into action one after another so that an excessive surge of current is not caused as might occur by starting the units simultaneously.

A further feature of the present invention is in the provision of a machine tool having a plurality of work units and a turret unit, in conjunction with a control system for the initiation of operation of the turret and of the several units in predetermined relationship to one another, and with the provision of safety controls for preventing false operations when the proper sequence of operation has not been completed.

With these and other features as objects in view, an illustrative form of practicing the invention is set forth in the accompanying drawings, in which:

Figure 1 is a plan view of a machine tool of the present nature, with three work units and a turret unit thereon.

Figure 2 is a side elevation of such a tool.

Figure 3 is a horizontal view substantially on line 3—3 of Figure 2, showing the arrangement of parts within the turret unit.

Figure 4 is a horizontal sectional view of the same substantially on line 4—4 of Figure 2.

Figure 5 is a circuit diagram.

In the drawings, a general standard or base 10 has a top surface which is provided with an arcuate guide 11 concentric with the axis of a turret unit TU having a rotatable turret table TT. Such a turret unit is more fully disclosed in my copending application Serial No. 683,541 filed August 3, 1933, to which reference is made for details of construction and arrangement.

As shown in Figures 3 and 4, the turret unit has a general housing TH which supports a turret motor TM which operates through gears 12 and 13 to drive a shaft 14 to which is keyed a clutch member 15 cooperative with a second clutch member 16 formed as a part of an axially movable sleeve 17 mounted on the shaft 14. Splined to the sleeve 17 is a worm 18 which engages with a worm wheel 19 keyed to a shaft 20. The shaft 14 is supported by anti-friction bearings 21 and 22, the bearing 22 being carried by an axially movable sliding member 23 which is normally forced toward the right in Figure 4 by a spring 24, this spring operating to press the bearing (which floats on the shaft 14) toward the right and against a thrust bearing 25 which maintains the worm 18 normally in its right-hand position. The shaft 20 has a switch actuating cam 50 fixed thereto for cooperation with a plunger 51 of the switch TS. The shaft 20 also has a plate 32 at its upper end which is provided with abutments 33, illustrated as spaced 180 degrees from one another about the periphery of the plate 32 and adapted to cooperate individually with an engaging member 62 of a lever 60 which is supported by a pivot 61 on the housing TH and is pivotally connected to a link 63 at its other end. The link 63 is connected to a core 64 of a solenoid 65. The lever 60 also has a resetting piece 60b for cooperating with resetting plates 32a fixed on the plate 32.

In operation when the motor TM is energized, the gears 12 and 13 are turned and therewith the clutch members 15 and 16 cause a rotation of the worm 18 and thus of the worm wheel 19 and the shaft 20, so that the plate 32 and the abutments 33 drive the turret table TT in rotation. This rotation continues until the abutment 33 encounters the member 62 and is detained thereby. The worm 18 then tends to draw itself axially against the action of spring 24, so that the friction pressure between clutch members 15 and 16 drops and the motor drive no longer is transmitted to the turret table TT. When it is desired to index the turret, the solenoid 65 is energized so that the core 64 is retracted and link 63 is moved toward the left in Figure 3, thus releasing the member 62 from engagement with the abutment 33 and permitting a further movement of the shaft 20 and plate 32.

During the course of this further movement, the plate 32a encounters the resetting member 60b and causes a return of the lever 60 into position for engaging the other abutment 33. During the course of this movement, the switch cam 50 causes a closure and an opening of the switch TS as will be described hereinafter.

Further, in Figures 1 and 2 are shown a plurality of work units WU1, WU2 and WU3. These units are illustrated as being of the form described and shown in my copending application Serial No. 628,395 filed August 11, 1932, to which reference is made as to the particular assemblage employed. Each of the units has a spindle S1, S2, S3 which is illustrated as having a hole for a drill. This spindle is driven in rotation for operating the drill by a corresponding spindle motor SM1, SM2, SM3 fixed on the general housing of the corresponding work unit. Each work unit is further illustrated as having a bed piece B1, B2, B3 which may be secured at any desired position upon the guide 11 or upon the angle support AA illustrated for the work unit WU3 and which support itself is movable upon the guideway 11 and can be secured thereon in any desired angular position about the axis of the general standard 10.

Each work unit is provided with a feeding mechanism therein (of the type illustrated in my application Serial No. 628,593 aforesaid, for example) which includes a member operatively rotated through a coupling 30. Each work unit has associated therewith an individual source of power for the feeding system comprising in this illustration the feed motors FM1, FM2, FM3. These motors are fixed to the general standard 10 and are illustratively located thereon at angles which are related to the number of stations provided on the turret table TT; here six stations are so provided and the motor FM2 is spaced 120 degrees from the motor FM1, and motor FM3 is spaced 60 degrees from motor FM2, but it will be understood that this spacing may be varied according to the shape of the space allowable for the particular machine tool, and that one of the virtues of the present invention is that such departures from said arrangement may be made.

The feed motor is connected to the corresponding work unit through a flexible shaft 40 which may be of any desired length for properly associating the parts involved. When the feed motor is energized for rotation in one direction, the corresponding spindle is fed forward, and when energized for rotation in the reverse direction, a reverse movement of the spindle is accomplished, this being associated with a rapid approach traverse and a slow feed, and a rapid reverse traverse as set out in my copending application Serial No. 628,395, if so desired, by employing the structure described therein.

It will be noted, however, that the respective work units may be adjusted angularly about the axis of the turret table by moving the beds on the guideway 11 and then clamping in the desired position, without major change or relocation of the corresponding feed motor, as the flexible shafts 40 of sufficient length to allow such movement of desired extent are employed.

It will be noted, for example, that the work unit WU2 is located at an angle of about 70 degrees from the work unit WU3, while the feed motor FM2 has not been changed from its relationship with respect to feed motor FM3. Thus it is possible to arrange and adjust the tools according to the character of operation to be done upon an article of work supported in the vises at the work stations of the turret table TT.

Each of the spindles S1 is provided with a lateral projection 41 which is fixed to a sliding feed control rod 42 in the corresponding unit, as illustrated for the unit WU3 in Figure 2, this rod having the forward feed dog FD and the reverse feed dog RD thereon for cooperation with the corresponding forward limit switch FL and the reverse limit switch RL. It will be understood that each unit has corresponding devices as described hereinafter in respect to Figure 5.

In Figure 5, the circuit diagram is represented with two work units WU1 and WU2 connected for operation. Each of these units is provided with forward and reverse limit switches, with a spindle motor, a feed motor, a forward relay, and a reverse relay, and also with a brush for cooperation with the common timed automatic control switch CS.

The work unit WU1 has the main switch MS—1, the spindle motor SM—1, the reverse relay R—1, the feed motor FM—1, the forward relay F—1, the spindle S—1, the forward limit switch FL—1 with its actuating dog FD—1, the reverse limit switch RL—1, with its actuating dog RD—1, and the brush 212 cooperative with the projection 213 of the common timed switch CS. Correspondingly, the work unit WU2 has the main switch MS—2, the spindle motor SM—2, the feed motor FM—2, etc., and the brush 212a.

Current is supplied to the system by the three phase conductors 200a, 200b, 200c which are connected to the switches MS—1 and MS—2 and thence by branch conductors 201a, 201b and 201c to terminals of the several relays. A pilot conductor 210 or 210a is branched from the conductor 201c and leads to a coil F—1s or F—2s of the forward relays and thence by a continuation of the conductor 210 or 210a to separate terminals of the starting relay SR and thence by a conductor 211 or 211a to the brush 212 or 212a for engagement by the projection 213 of the common switch CS, and thence by the maintained brush 214 thereof and conductor 215 back to a branch conductor 201a. These circuits when closed cause an energization of the forward relays F—1 and F—2, which individually operate when so energized to close the maintaining circuit thereof so long as the forward limit switches FL—1 and FL—2 respectively remain closed, from the conductor 210 or 210a through the respective switch, and by the respective conductor 216 or 216a to a bridge F—1a or F—2a of the relay and thence by conductor 217 to the hand stopping switch HS, and thence by conductor 218 back to a branch conductor 201a.

As the work unit starts its forward movement, the reverse limit switch RL1 or RL2 is closed, so that a reversing circuit is tentatively set up which extends from a respective branch conductor 201a by conductor 219 or 219a through the reverse limit switch and thus by conductor 219 or 219a to the bridge F—1b or F—2b of the forward relay (this bridge being raised and thus interrupting the tentative reversing circuit), the other cooperative terminal of this bridge in each relay being connected by a conductor 220 or 220a with a coil R—1s or R—2s of the corresponding reverse relay and thence by a conductor 221 or 221a back to a branch conductor 201c.

An automatic initiating circuit comprises a pilot conductor 230 which is branched from a branch conductor 201b and leads to the bridge of the turret switch TS which is under control of the cam 50 as described above. When the switch TS is closed, current may flow along through conductor 231 to the coil of the starting relay SR and thence back by conductor 232 to a branch conductor 201c. The energization of the starting relay SR causes the closure thereat of circuits through conductors 210—211 and 210a—211a.

The conductor 233 which branches from conductor 230 leads to a timing motor TM with a return by conductors 234 and 235 to the brush 236 of the common switch CS with a return by brush 214 and conductor 215 to the branch conductor 201a. So long as the brush 236 is engaged with the corresponding conductive surface of the common switch CS, the timing motor TM continues to turn.

The solenoid 65 which controls the release of the turret latch in the illustrative form shown is connected at one terminal to the conductor 233 and at the other terminal by a conductor 237 to a brush 238 which is contacted by the projection 213 of the common switch CS at a predetermined angular position thereof.

A control circuit includes the conductor 239 which is connected to a branch conductor 201a and leads to a contact in relay R—1 which is controlled by the bridge R—1a thereof so that the circuit may be closed when the relay is open, this circuit extending by a conductor 240 having similar control at a bridge F—1c of forward relay F—1, thence by a conductor 241 having similar control at a relay bridge R—2a, by conductor 242 having similar control at a bridge F—2c, and thence by conductor 243 through the hand control switch HC and by conductors 244 and 234 to the timing motor TM and thus to the conductors 233, 230 and 201b; it will be noted that this circuit is only closed when all relays are open, both feed motors are de-energized, and the hand control switch HC is closed. The aforesaid circuit from the motor TM by conductors 235 and 236 may be regarded as a maintaining circuit for this control circuit.

In operation, the turret presents one station at a position for discharge and reloading while the tools are operating at other stations. The attendant, for example, is thus enabled to discharge and reload during the operating period so that a maximum effective time of service of the tool is assured.

Assuming that the operating cycle terminates when the work units have all returned to withdrawn position, at which time the turret is yet at a standstill, the common switch CS has its peripheral notch opposite the brush 236 so that the timing motor TM is de-energized and motionless and thus common switch CS is at a standstill with its projection 213 to the left of brush 238, and the operating cam 50, plate 23, and latch lever 60 are in the position shown in Figure 5, with starting relay SR still closed, the cycle of operation may be as follows:

The return of all work units to withdrawn position results as described hereinafter in an opening of all relays therefor, and a control circuit is closed by conductor 239, bridge R—1a, conductor 240, bridge F—1c, conductor 241, bridge R—2a, conductor 242, bridge F—2c, conductor 243 and the hand control switch HC. If this hand control switch HC remains closed, or if it now be momentarily closed, the circuit continues by conductors 244 and 234 to the timing motor TM and thence by conductors 233 and 230.

The timing motor TM starts and shortly thereafter the projection 213 encounters the brush 238, current flows from conductors 230 and 233, through the solenoid 65 and conductor 237 to brush 238, and thus causes energization of solenoid 65, and the turret plate 23 is released for indexing the turret to a new station. During this indexing movement of 180 degrees of plate 23, the cam 50 initially releases the turret switch TS so that no circuits can be completed to and through the starting relay SR, as a safety measure; but the cam 50 will reclose the turret switch TS as the turret attains a new station. Meanwhile the projection 213 has left brush 238 and the turret latch lever 60 is restored to its latching position, so that the parts return to the position of Figure 5.

The maintaining circuit for the timing motor TM also has meanwhile been established by the plate of the common switch CS which contacts with brush 236 and permits current to flow by conductor 215, brush 214, the plate of the common switch CS, brush 236 and conductors 235 and 234 to the timing motor TM. As the timing motor TM continues to turn, the projection 213 of the common switch CS encounters the brush 212 corresponding to the first work unit WU1. A starting circuit is thus closed by conductor 210, the coil of relay F—1, conductor 210, a bridge of starting relay SR, conductor 211, brush 212, projection 213, the plate of the common switch CS, brush 214 and back by conductor 215. The forward relay F—1 is closed, thus connecting the feed motor FM—1 for forward motion, and breaking circuits through the conductors 220 and 240. Likewise, a maintaining circuit is closed at the forward limit switch FL—1 through conductors 210, the limit switch, conductors 216, bridge F—1a, conductor 217, hand-stopping switch HS and conductor 218, so that the relay F—1 will continue energized after the projection 213 has left brush 212.

Shortly thereafter the projection 213 encounters brush 212a and similar circuits are set up for the feed motor FM—2. The two work units WU1 and WU2 are thus successively energized and begin their forward or working movement. Meanwhile, the common switch CS continues to turn at a rate determined by the timing motor TM and the gearing G. This establishes and maintains the forward traverse and tool feeding movement of the work units. It may be terminated at any time by manually depressing the hand stopping switch HS which opens the maintaining circuits through conductor 217 and thus causes the forward relays F—1 and F—2 to become de-energized and drop to open position.

As soon as each unit has reached the limit of its forward movement as determined by the positioning of the respective dogs FD—1 and FD—2, the corresponding forward limit switches are opened. The individual maintaining circuit of the corresponding forward relay is de-energized, the relay drops open and the corresponding feed motor comes to a standstill.

In either case, whether the relay is opened by an operation of the hand stopping switch HS or by the operation of the corresponding forward limit switch, an automatic reversal of the traverse movement is accomplished, so long as the reverse limit switch is closed.

For this purpose the opening of the forward relay F—1 or F—2 serves to close a reversing circuit by a conductor 219 or 219a, bridge F—1b or F—2b, conductor 220 or 220a, and the coil of the corresponding reverse relay, with a return by conductor 221 or 221a. The reverse relay or relays are thus closed for energizing the corresponding feed motor or motors in the opposite direction for producing a withdrawal of the tool from the work. This withdrawal continues until the reverse limit switch in the work unit is operated to open the circuit through the reverse relay R—1 or R—2, and thus bring the corresponding feed motor to a standstill.

It will be understood that in this way a normal cycle of operation of the two work units WU1 and WU2 is accomplished, the units being started successively, operating at a desired rate of speed and for a given distance as determined by the construction, arrangement and adjustment of the respective unit, and with each unit completing its operation and coming to a standstill as its reverse limit switch is opened. During this time, the common switch CS has been turned at a uniform rate by the timing motor TM. Ultimately, the conductor plate of the switch CS presents its peripheral notch opposite brush 236 so that the aforesaid circuit through brush 236 from the timing motor TM is interrupted and the motor may come to a standstill if the hand control switch HC is open. That is, the switch HC then serves to cause the tool to operate as a semi-automatic tool. Each monetary closure of the switch HC starts the energization of the timing motor TM, and then the common switch CS determines the cycle and brings the timing motor TM to a stop at the end of the cycle.

It will be noted that if the turret be stalled for any reason, the cam 59 does not produce a closing of the starting relay SR and hence the work units WU1 and WU2 cannot be given a feeding movement except when the turret is in proper position therefor.

It will further be noted that, if the hand control switch HC is kept closed for fully automatic operation, should any work unit fail to complete its cycle during the time prior to the encounter of projection 213 with brush 238 (which normally initiates the turret movement), one of the two relays for this work unit will be in raised position, so that the timing motor circut by conductors 239—244 will be open at such relay, and therefore the current supply and the timing motor TM will be interrupted as soon as the notch of the common switch CS comes opposite brush 236, bringing the timing motor to a standstill and suspending the indexing of the turret until such time as the reverse relay in the delayed work unit shall have dropped to open position. Thus the turret cannot be indexed unless the work units are in proper position therefor.

While an illustrative form of practicing the invention has been set forth in the description and drawings, it is obvious that the invention is not limited thereto but that it may be practiced in many ways within the scope of the appended claims.

Having thus described the invention, what I claim as new and desire to secure by Letters Patent, is:

1. A device of the class described, comprising a stand and a work holder on said stand; a work unit including a base adjustable on said stand and including a tool, means for driving the same and means for feeding the tool toward the work in said holder; a feed motor fixed on said stand; transmission means including a flexible feed shaft connecting said motor and said feeding means, and means coordinately connected with said holder and work unit for controlling said feed motor.

2. A device of the class described, comprising a stand; a work unit including a base adjustable angularly about an axis on said stand and including a tool, means for driving the same, a holder for said tool movable toward and from the axis, and means for feeding the tool and support; a work holder mounted on said stand at said axis so that the movement of the tool holder is toward and from said work holder; a feed motor fixed on said stand; transmission means including a flexible shaft connecting said motor and said feeding means, and means coordinately connected with said holder and work unit for controlling said feed motor.

3. A device of the class described, comprising a stand; a plurality of work units each including a base adjustable on said stand and including a tool, means for driving the same, and means for feeding the tool; an individual feed motor for each work unit fixed on said stand; transmission means including a flexible feed shaft connecting said motor and said feeding means; a work-holding turret mounted on said stand; and means connected with the turret and each work unit for selectively actuating the feed motors and turret cyclically.

4. A device of the class described, comprising a stand; a plurality of work units each including a base adjustable on said stand and including a tool, means for driving the same, and means for feeding the tool; an individual feed motor for each work unit fixed on said stand; a flexible shaft connecting said motor and said feeding means; a work-holding turret mounted on said stand; and means connected with the turret and each work unit for cyclically actuating the same and including a common selector means for energizing the feed motors in succession whereby to avoid imposing starting surges of more than one said motor simultaneously upon the supply line.

5. In a device of the class described, comprising a plurality of simultaneously operating work units each having an electric feed motor, a source of electric current, and circuits connecting the source to said feed motors and including means for sucessively connecting the feed motors for energization whereby to avoid the imposing of starting current surges from more than one said feed motor upon said source.

6. A device of the class described, comprising a plurality of simultaneously operating work units each having an electric feed motor, a source of electric current, and circuits connecting the source to said feed motors and including a timed switch means for successively establishing the connection of the feed motors.

7. A device as in claim 6, in which the timed switch means includes a timing motor and control means for de-energizing the timing motor when all the work units have not attained a predetermined position during a predetermined time.

8. A device as in claim 6, in which the timed switch means includes a timing motor and pilot means for initially energizing the timing motor when all work units are in a predetermined position and maintaining means including contacts in said timed switch means for continuing the energization of said timing motor.

9. A device of the class described including a work unit having a feed motor and a limit switch; a turret including an indexing motor and a control switch; a source of electric current, and circuits connecting said source and motors and including a timed switch means for energizing the the motors individually; and pilot circuit means controlled by said switches for starting the timed switch means and operable when the turret and unit are in predetermined positions, said timed switch means thereupon operating to effect energization of the feed motor until said limit switch is operated and then to effect energization of the indexing motor, and means controlled by the control switch to prevent energization of the feed motor except in a predetermined position or positions of the turret.

10. A device of the class described including a work unit having a feed motor, a forward relay and a reverse relay, a forward limit switch, a reverse limit switch connected with said relays, a source of electric energy, and circuits extending from said source through the relays for energizing said feed motor; a turret, an indexing motor, a slipping gear train connecting the indexing motor and turret, an electromagnetically releasable detent for the turret, and a control switch closed at a predetermined position or positions of the turret; a timing motor, a timing switch member moved by said motor, an initiating circuit extending through said relays to be closed when the relays are in position to prevent the flow of current to said feed motor, said circuit when closed operating to energize the timing motor, a first contact means cooperative with said switch member to maintain the energization of the timing motor for a given time and then interrupt the same, and a second contact means cooperative with said switch member to energize said electromagnetically releasable detent for indexing the turret after said first contact means has opened and after said initiating circuit has been closed again.

11. A metal working machine comprising in combination a supporting frame, a plurality of independently operable metal working units; each unit comprising a tool spindle, means for rotating said spindle, and a feeding means for advancing and retracting said spindle; a feed operating unit independent of said rotating means and mounted on said frame, a power transmitting connection between the feed operating unit and the feeding means operatively permitting the working unit to be shifted on the frame with respect to the feed operating unit; means for automatically stopping said feeding means when the corresponding spindle is in retracted position; a work supporting turret mounted on said frame, and means for indexing said turret to predetermined positions, and a controlling means for initiating the operation of all of said metal working units after the turret has been indexed to a said predetermined position.

12. A metal working machine comprising in combination a supporting frame, a plurality of cyclically operating work units, each work unit having an individual power driving and feeding mechanism and means for stopping said feeding mechanism upon completion of a cycle of operations, a work supporting turret mounted on said frame, power means for intermittently indexing said turret to predetermined positions, and an independently operated controlling device for operation on a predetermined timing cycle for initiating an operation of the turret indexing means and for initiating the feeding of the work units.

13. A device of the class described, comprising a plurality of cyclically operating work units each having power driving and feeding and feed controlling mechanisms, said feed controlling mechanism of each work unit operating to bring its unit to a standstill upon the completion of a cycle of operations, a turret for supporting work for presentation to the work units, means for indexing the turret intermittently and holding it at a standstill in predetermined positions of presentation relative to said work units; and a timing mechanism for initiating the operation of the turret indexing means and of the feed controlling mechanisms in sequence.

14. A device of the class described, comprising a cyclically operated working unit having power driving and feeding and feed controlling mechanisms, said feed controlling mechanism operating to bring it to a standstill upon the completion of a cycle of operations, a turret for supporting work for presentation to the work unit, means for indexing the turret intermittently and holding it at a standstill in predetermined positions of presentation relative to said work unit; a timing mechanism for initiating the operation of the turret indexing means and of the feed controlling mechanism in sequence, and means controlled by the position of the work unit for delaying the action of the timing mechanism when the unit has not completed a cycle of operation in the time period prescribed by said timing mechanism.

EDWARD JOSLIN KINGSBURY.